(12) United States Patent
Kumagai et al.

(10) Patent No.: US 11,577,399 B2
(45) Date of Patent: Feb. 14, 2023

(54) ROBOT SYSTEM, METHOD FOR CONTROLLING ROBOT, ROBOT CONTROLLER, AND NON-TRANSITORY COMPUTER-READABLE STORAGE MEDIUM

(71) Applicant: KABUSHIKI KAISHA YASKAWA DENKI, Kitakyushu (JP)

(72) Inventors: Hiroshi Kumagai, Kitakyushu (JP); Tamio Nakamura, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 458 days.

(21) Appl. No.: 16/748,820

(22) Filed: Jan. 22, 2020

(65) Prior Publication Data

US 2020/0238530 A1 Jul. 30, 2020

(30) Foreign Application Priority Data

Jan. 30, 2019 (JP) .............................. JP2019-014686

(51) Int. Cl.
*B25J 9/16* (2006.01)
*B25J 19/04* (2006.01)

(52) U.S. Cl.
CPC ........... *B25J 9/1697* (2013.01); *B25J 9/1653* (2013.01); *B25J 19/04* (2013.01)

(58) Field of Classification Search
CPC ........ B25J 9/1697; B25J 9/1653; B25J 19/04; B25J 9/162; B25J 9/161; B25J 13/00;
(Continued)

(56) References Cited

U.S. PATENT DOCUMENTS

2012/0158179 A1 6/2012 Ooga
2019/0099888 A1* 4/2019 Takikawa ............... B25J 9/1694
(Continued)

FOREIGN PATENT DOCUMENTS

JP 4222338 B2 11/2006
JP 2007-011978 1/2007
(Continued)

OTHER PUBLICATIONS

Machine translation of JP-2012245568-A.*
(Continued)

*Primary Examiner* — Robert T Nguyen
(74) *Attorney, Agent, or Firm* — Mori & Ward, LLP

(57) ABSTRACT

A robot system includes a robot, a vision sensor, a target position generation circuit, an estimation circuit, and a control circuit. The robot includes an end effector and is configured to work via the end effector on a workpiece which is disposed at a relative position and which is relatively movable with respect to the end effector. The vision sensor is configured to take an image of the workpiece. The target position generation circuit is configured to, based on the image, generate a target position of the end effector at every generation interval. The estimation circuit is configured to, at least based on relative position information related to the relative position, estimate a change amount in the relative position at every estimation interval. The control circuit is configured to control the robot to move the end effector based on the target position and the change amount.

13 Claims, 5 Drawing Sheets

(58) Field of Classification Search
CPC ......... B25J 13/088; G05B 2219/39057; G05B 2219/40298
See application file for complete search history.

(56) References Cited

U.S. PATENT DOCUMENTS

| | | | |
|---|---|---|---|
| 2019/0160682 A1* | 5/2019 | Sato | B25J 9/162 |
| 2021/0149412 A1* | 5/2021 | Shimoyama | G06V 10/50 |
| 2021/0197391 A1* | 7/2021 | Ohnishi | B25J 19/023 |
| 2022/0088795 A1* | 3/2022 | Aoki | B25J 9/1697 |

FOREIGN PATENT DOCUMENTS

| | | | |
|---|---|---|---|
| JP | 5306313 B2 | 7/2012 | |
| JP | 2012-245568 | 12/2012 | |
| JP | 2012245568 A * | 12/2012 | B25J 13/08 |

OTHER PUBLICATIONS

Japanese Office Action for corresponding JP Application No. 2019-014686, Apr. 14, 2020 (w/ machine translation).
Chinese Office Action for corresponding CN Application No. 202010040484.8, dated Oct. 8, 2022 (w/ English machine translation).

* cited by examiner

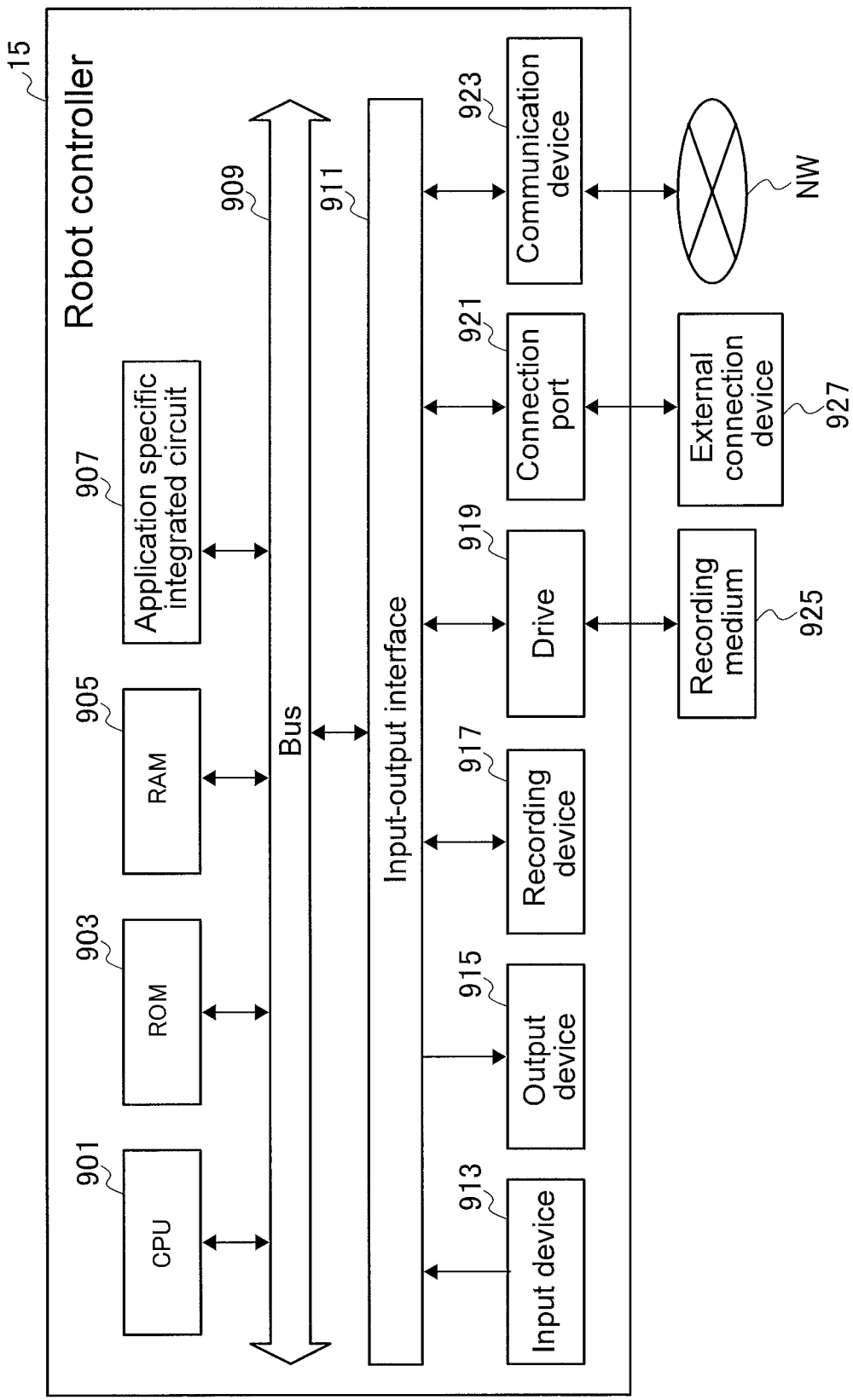

ROBOT SYSTEM, METHOD FOR CONTROLLING ROBOT, ROBOT CONTROLLER, AND NON-TRANSITORY COMPUTER-READABLE STORAGE MEDIUM

CROSS-REFERENCE TO RELATED APPLICATIONS

The present application claims priority under 35 U.S.C. § 119 to Japanese Patent Application No. 2019-014686, filed Jan. 30, 2019. The contents of this application are incorporated herein by reference in their entirety.

BACKGROUND

Field of the Invention

The embodiments disclosed herein relate to a robot system, a method for controlling a robot, a robot controller, and a non-transitory computer-readable storage medium.

Discussion of the Background

JP 4222338B, JP 2007-011978A, and JP 5306313B disclose techniques related to visual feedback (VFB: Visual FeedBack). In VFB, the position and/or posture of a robot is controlled based on an image taken by a vision sensor or an external sensor.

SUMMARY

According to one aspect of the present disclosure, a robot system includes a robot, a vision sensor, a target position generation circuit, an estimation circuit, and a control circuit. The robot includes an end effector and is configured to work via the end effector on a workpiece which is disposed at a relative position and which is relatively movable with respect to the end effector. The vision sensor is configured to take an image of the workpiece. The target position generation circuit is configured to, based on the image, generate a target position of the end effector at every generation interval. The estimation circuit is configured to, at least based on relative position information related to the relative position, estimate a change amount in the relative position at every estimation interval. The control circuit is configured to control the robot to move the end effector based on the target position and the change amount.

According to another aspect of the present disclosure, a method for controlling a robot with an end effector includes taking an image of a workpiece on which the robot is configured to work via the end effector, which is disposed at a relative position, and which is relatively movable with respect to the end effector. The method further includes generating, based on the image, a target position of the end effector at every generation interval; estimating a change amount in the relative position at every estimation interval at least based on relative position information related to the relative position; and controlling the robot to move the end effector based on the target position and the change amount.

According to another aspect of the present disclosure, a robot controller to control a robot includes a target position generation circuit, an estimation circuit, and a control circuit. The target position generation circuit is configured to generate a target position of an end effector of the robot at every generation interval based on an image of a workpiece on which the robot is configured to work via the end effector, which is disposed at a relative position, and which is relatively movable with respect to the end effector. The estimation circuit is configured to, at least based on relative position information related to the relative position, estimate a change amount in the relative position at every estimation interval. The control circuit is configured to control the robot to move the end effector based on the target position and the change amount.

According to the other aspect of the present disclosure, a non-transitory computer-readable storage medium stores a program for causing a computer to perform, in a robot controller, taking an image of a workpiece on which the robot is configured to work via the end effector, which is disposed at a relative position, and which is relatively movable with respect to the end effector; generating, based on the image, a target position of the end effector at every generation interval; estimating a change amount in the relative position at every estimation interval at least based on relative position information related to the relative position; and controlling the robot to move the end effector based on the target position and the change amount.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 5 is a diagram illustrating an example hardware configuration of the robot controller of the robot system according to the embodiment.

DESCRIPTION OF THE EMBODIMENTS

Figure 1:
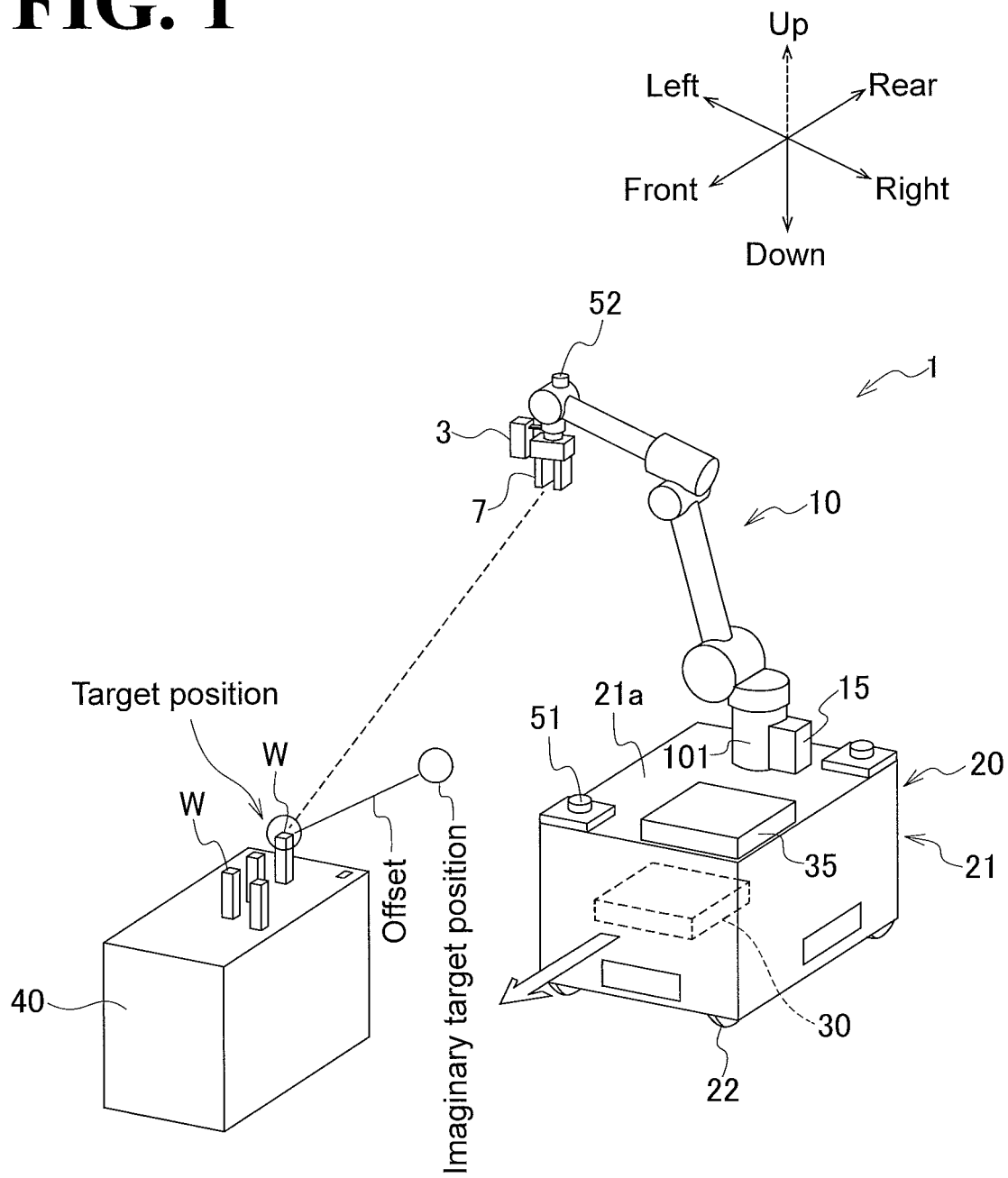
FIG. 1 illustrates an example general arrangement of a robot system according to an embodiment.

The embodiments will now be described with reference to the accompanying drawings, wherein like reference numerals designate corresponding or identical elements throughout the various drawings.

General Arrangement of Robot System

By referring to FIG. 1, an example general arrangement of a robot system 1 according to an embodiment will be described. In this embodiment, the robot system 1 is capable of performing predetermined work while moving a robot 10 on a movable member (an example of "a carrier") 20.

As illustrated in FIG. 1, the robot system 1 according to this embodiment includes the robot 10, a robot controller 15, a vision sensor 3, a vision sensor controller 35, the movable member 20, and a movable member controller 30.

In this embodiment, the robot 10 uses an end effector 7 to perform predetermined work on a workpiece W. The workpiece W is disposed at a relative position changeable relative to the end effector 7. A non-limiting example of the robot 10 is a vertical multi-articular six-axis robot, having six joints. It is to be noted, however, that the robot 10 may be other than a six-axis robot, such as a five-axis robot and a seven-axis robot. Also, the robot 10 may be other than a vertical multi-articular, such as a horizontal multi-articular robot and a parallel link robot.

In this embodiment, the robot 10 includes the end effector 7, which is mounted on a leading end portion of the robot 10. Examples of the end effector 7 include, but are not limited to, a hand, a welding torch, and any other tool.

In this embodiment, a non-limiting example of the predetermined work is to hold the workpiece W on a table 40 using the end effector 7 and transfer the workpiece W to a destination table. It is to be noted, however, that the predetermined work will not be limited to the work of transferring the workpiece W; another possible example is to combine a plurality of workpieces W together and assemble the combined workpieces W into a part or a component. When the end effector 7 has a plurality of kinds of replacements, the predetermined work may be coating, riveting, nailing, spot welding, stapling, and/or bolt tightening.

In this embodiment, the vision sensor 3 takes an image of the workpiece W at a predetermined image-taking interval. The vision sensor 3, which is also referred to as a visual sensor, takes a two-dimensional or three-dimensional image of an object and processes the image to calculate a feature quantity of the object. Then, the vision sensor 3 outputs the feature quantity in the form of an image. Examples of the vision sensor 3 include, but are not limited to, a two-dimensional camera and a three-dimensional camera. It is to be noted that the vision sensor 3 may take an image of an object continuously in terms of time or a plurality of times intermittently. The vision sensor 3 is connected to the vision sensor controller 35, which is mounted on the movable member 20, so that the image taken by the vision sensor 3 is transmitted to the vision sensor controller 35.

The vision sensor 3 may detect a three-dimensional position of the workpiece W in a real-time manner at the time when the robot 10 performs the predetermined work. In this case, the vision sensor 3 may be mounted on a wrist portion of the robot 10 in such a posture that a hand end portion of the end effector 7 is included within the field of vision of the vision sensor 3. It is to be noted, however, that the vision sensor 3 may be mounted on another position on the robot 10 or may be mounted on the movable member 20. It is also to be noted that while in this embodiment a single vision sensor 3 is provided, two or more vision sensors 3 may be provided.

In this embodiment, the movable member 20 is movable relative to the workpiece W with the robot 10 mounted on the movable member 20. In the following description, the movable member 20 and related elements are described using direction-indicating terms, such as "up", "down", "right", "left", "front", and "rear". These terms, however, are not intended as limiting the positions of the movable member 20 and related elements. Also, "forward", "rearward", and other related direction-indicating terms respectively correspond to "forward" and "rearward" in the direction of progress of the movable member 20.

A non-limiting example of the movable member 20 is an unmanned guided vehicle (AGV) that is tracklessly movable in a factory, a plant, or another industrial facility under the control of the movable member controller 30. Another non-limiting example of the movable member 20 is a conveyor.

As illustrated in FIG. 1, the movable member 20 includes a rectangular parallelepiped housing 21. In the housing 21, the movable member controller 30 is disposed. In the example illustrated in FIG. 1, the robot 10 is disposed in a rear half area of the upper surface, 21*a*, of the housing 21, and the vision sensor controller 35 is disposed in a right half area of a front half area of the upper surface 21*a*. At four corners of the lower surface of the housing 21, wheels 22 are disposed.

As illustrated in FIG. 1, a movable member vibration sensor 51 is disposed at a position on the movable member 20 that is further frontward than the robot 10 in its direction of progress. The movable member vibration sensor 51 detects a vibration of the movable member 20. Also as illustrated in FIG. 1, a robot vibration sensor 52 is disposed at a position on the robot 10. The robot vibration sensor 52 detects a vibration of the robot 10.

In this embodiment, the robot controller 15 controls the robot 10 and is mounted on a base 101 of the robot 10, as illustrated in FIG. 1. It is to be noted that the robot controller 15 may be disposed at a position separate from the robot 10.

Figure 2:
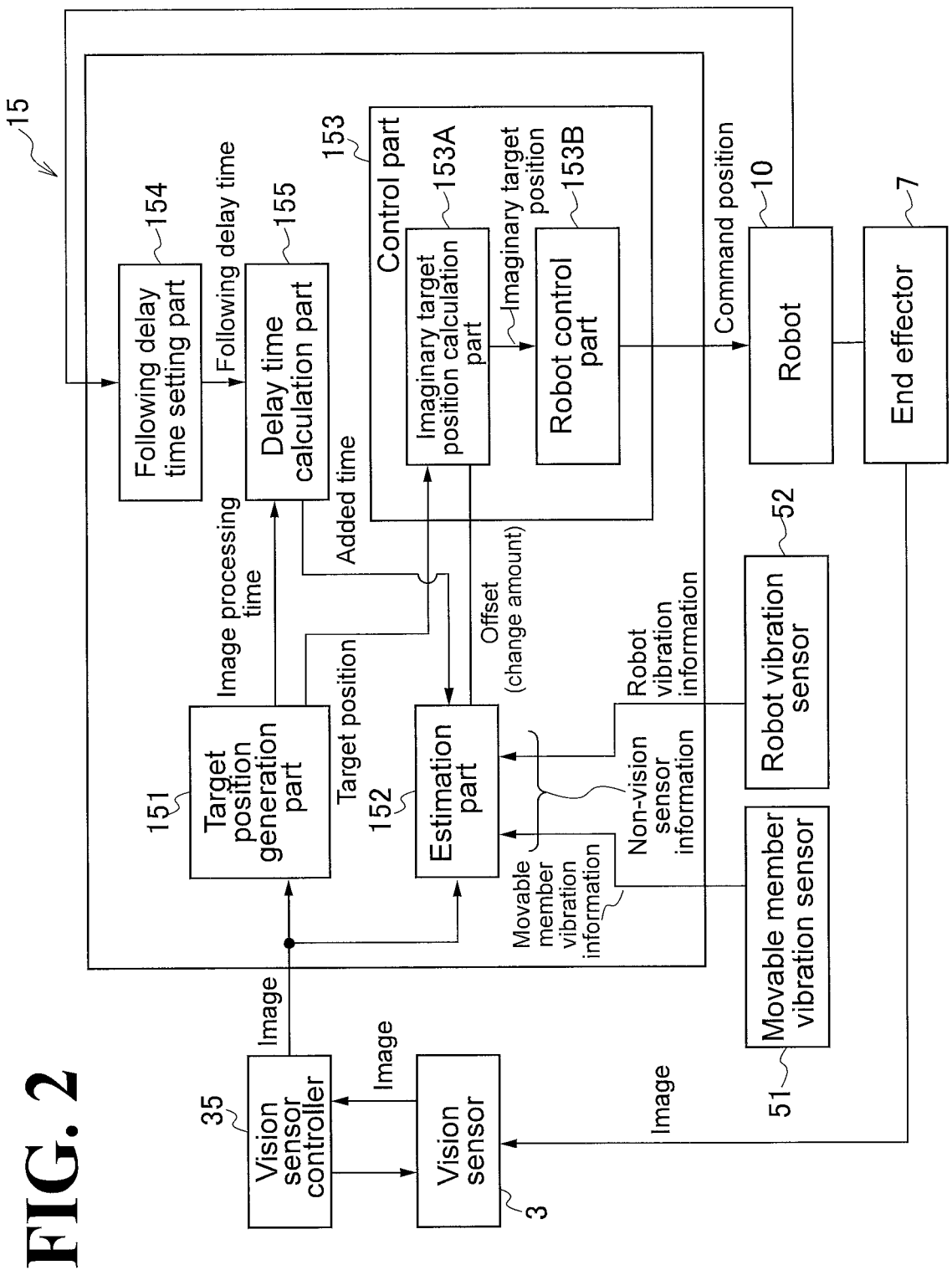
FIG. 2 illustrates an example functional configuration of a robot controller of the robot system according to the embodiment.

As illustrated in FIG. 2, the robot controller 15 includes a target position generation part 151, an estimation part 152, a control part 153, a following delay time setting part 154, and a delay time calculation part 155.

Based on the image taken by the vision sensor 3, the target position generation part 151 generates a target position of the end effector 7 at a predetermined generation interval. The target position is a position to which the end effector 7 is to move (denoted as "Xt(i)a" in FIG. 4). The generation interval may be an interval equal or similar to the interval at which the vision sensor 3 takes an image.

The following delay time setting part 154 sets following delay time dta. The following delay time dta is a period of time by which the robot 10 is delaying a response to a position command. Specifically, the following delay time setting part 154 calculates the following delay time dta based on acceleration and deceleration information. The acceleration and deceleration information is regarding acceleration and deceleration of the robot 10. For example, the following delay time dta is identifiable based on time constant of a frequency response of the robot 10 approximated to a filter.

It is to be noted that the position command is a command for controlling the motor disposed in each of the axes of the robot 10 such that the end effector 7 moves to a command position included in the position command.

Specifically, the following delay time setting part 154 sets the following delay time dta such that the following delay time dta differs at least when the robot 10 is in a motion starting state and when the robot 10 is in a motion stable state.

The delay time calculation part 155 calculates delay time that is equal to or longer than image processing time dtb. The image processing time dtb is a period of time necessary for the target position generation part 151 to generate the target position. The delay time may be the image processing time dtb or the sum of the image processing time dtb and the following delay time dta.

It is to be noted that the image processing time dtb may be set in advance or measured at a convenient timing. It is also to be noted that the image processing time dtb is measurable using a time stamp.

At least based on relative position information, which is related to a relative position of the workpiece W relative to the end effector 7, the estimation part 152 estimates, at a predetermined estimation interval, a change amount (that is, offset) of the relative position of the workpiece W relative to the end effector 7.

The relative position information may be the relative position of the workpiece W relative to the end effector 7 or may be relative speed V of the end effector 7 relative to the workpiece W.

Specifically, based on time-series data of the image obtained from the vision sensor controller 35, the estimation part 152 estimates, at present time t(i), a time change of the relative speed V of the end effector 7 relative to the workpiece W.

Then, the estimation part 152 integrates the time change of the relative speed V between time t(i) and time t(i)+dta+dtb. As a result, the estimation part 152 calculates offset Off (t(i)+dt(n)), which is the change amount of the relative position of the workpiece W relative to the end effector 7.

In other words, the estimation part 152 integrates the time change of the relative speed V by time equivalent to the image processing time dtb and the following delay time dta combined, thereby calculating the offset Off (t(i)+dt(n)).

That is, the estimation part 152 estimates the change amount based on the relative speed V of the robot 10 relative to the workpiece W and based on the delay time dtb, which is calculated by the delay time calculation part 155.

In order to make the estimation part 152's estimation more reliable, the estimation part 152 may use non-vision sensor information as well (such as information regarding speed or acceleration of the movable member 20), in which case an estimator such as Kalman filter is also used. Another possible example is that the estimation part 152 uses a known movement pattern of the movable member 20 to remove a noise component from the estimation that has been obtained.

As described above, in order to calculate the change amount (offset) of the relative position, it is necessary for the estimation part 152 to integrate the time change of the relative speed V between time t(i) and time t(i)+dta+dtb. For this purpose, it is necessary for the estimation part 152 to estimate a future speed of the movable member 20.

In light of this, when time-series data of a known speed of the movable member 20 (that is, a known movement pattern of the movable member 20) exists, the estimation part 152 positively utilizes the time-series data.

When no such time-series data exists, the estimation part 152 performs frequency analysis of time-series data of a past speed of the movable member 20 to extract a low-frequency component (that is, a frequency component that the robot 10 is able to follow). Then, the estimation part 152 synthesizes a low-frequency component using the present estimated speed as a DC component, thereby estimating future time-series data. This estimation processing is performed under the assumption that when there is a change in the speed of the movable member 20, the change is due to a rotation mechanism and/or a friction and is basically a periodic change.

The estimation part 152 estimates the change amount based on movable member vibration information. The movable member vibration information is related to a vibration of the movable member 20 detected by the movable member vibration sensor 51.

Also, the estimation part 152 estimates the change amount based on: movable member vibration information, which is related to a vibration of the movable member 20 detected by the movable member vibration sensor 51; and robot vibration information, which is related to a vibration of the robot 10 detected by the robot vibration sensor 52.

Even though the estimation part 152 estimates the change amount using vibration-related information, there is a delay of time before the information is reflected in the control of the robot 10 if the movable member vibration information, detected by the movable member vibration sensor 51 (see FIG. 3), is used as it is. In the meantime, the control of the robot 10 is presumed unstable.

Under the circumstances, it is necessary for the estimation part 152 to use, instead of the movable member vibration information obtained real-time, a vibration estimated value with a system delay taken into consideration (that is, the vibration estimated value is as of the time at which the vibration is reflected in the control of the robot 10). That is, it is necessary for the estimation part 152 to estimate future information based on present information.

Figure 3:
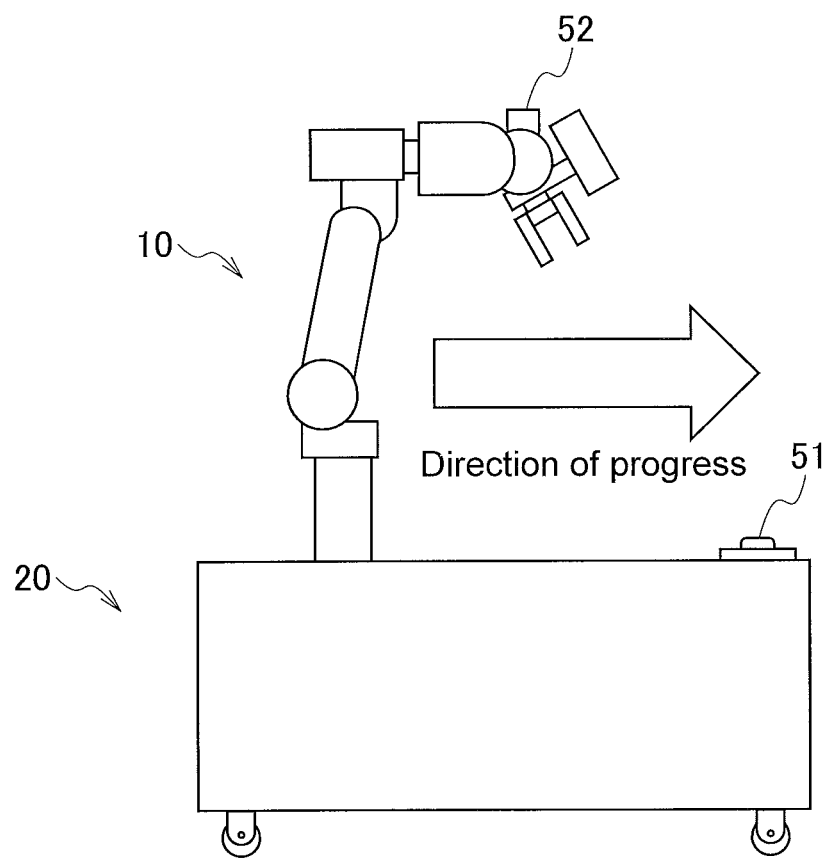
FIG. 3 illustrates an example position at which a sensor of the robot system according to the embodiment is disposed.

Thus, the robot vibration information, which is related to a vibration of the robot 10 detected by the robot vibration sensor 52 (see FIG. 3), is future information for the movable member vibration information, which is related to a vibration detected by the movable member vibration sensor 51 (see FIG. 3). In light of this, the estimation part 152 estimates the change amount with the movable member vibration information and the robot vibration information combined, ensuring a highly accurate estimation.

Alternatively, when there is a leading movable member located further forward than the movable member 20 targeted for estimation of the change amount, the estimation part 152 uses non-vision sensor information obtained by the leading movable member. This also ensures a highly accurate estimation.

The estimation part 152 estimates the change amount at an estimation interval. The estimation interval is shorter than the generation interval, at which the target position generation part 151 generates the target position.

It is to be noted that some or all of the functions of the estimation part 152 may be implemented as functions external to the robot controller 15.

The control part 153 controls the robot 10 based on the target position generated by the target position generation part 151 and based on the change amount estimated by the estimation part 152.

Specifically, as illustrated in FIG. 2, the control part 153 includes an imaginary target position calculation part 153A and a robot control part 153B.

The imaginary target position calculation part 153A calculates an imaginary target position of the end effector 7 by adding the change amount estimated by the estimation part 152 at the estimation interval to the target position generated by the target position generation part 151 at the generation interval.

The robot control part 153B controls the robot 10 such that the imaginary target position calculated by the imaginary target position calculation part 153A matches the command position of the end effector 7.

Method for Controlling Robot

By referring to FIG. 4, an example method for controlling the robot 10 in the robot system 1 will be described.

Figure 4:
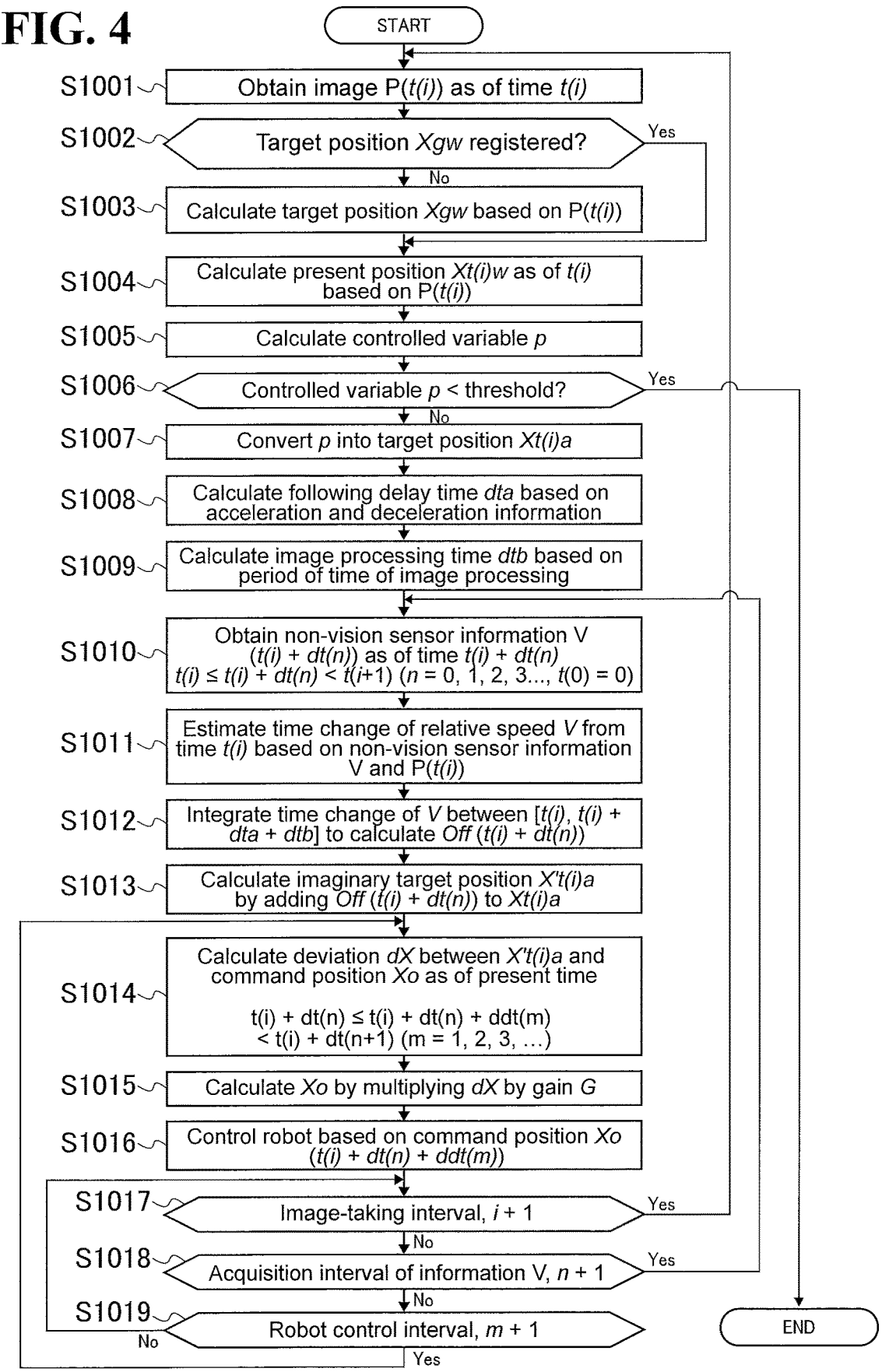
FIG. 4 is a flowchart of an example method for controlling a robot according to the embodiment.

As illustrated in FIG. 4, at step S1001, the robot controller 15 (the target position generation part 151) obtains an image P(t(i)) of the workpiece W from the vision sensor controller 35. The image P(t(i)) is an image of the workpiece W taken by the vision sensor 3 at time t(i) (i=1, 2, 3, and so forth).

It is to be noted that the image-taking interval, at which the vision sensor 3 takes an image of the workpiece W, is t(i+1)−t(i).

At step S1002, the robot controller 15 (the target position generation part 151) determines whether a target position Xgw of the end effector 7 is registered in a workpiece coordinate system (recognition target coordinate system). When the target position Xgw is registered, this method proceeds to step S1004. When the target position Xgw is not registered, this method proceeds to step S1003.

As used herein, the term "workpiece coordinate system" refers to a coordinate system fixed to the workpiece W. Therefore, even if the relative position of the workpiece W relative to the end effector 7 changes, the workpiece W remains at the same position as seen in the workpiece coordinate system.

At step S1003, the robot controller 15 (the target position generation part 151) calculates, based on the image P(t(i)), the target position Xgw of the end effector 7 in the workpiece coordinate system.

Specifically, the robot controller 15 (the target position generation part 151) registers in advance a known image P(t(i)) of the workpiece W and a known approach point (holding position), at which the end effector 7 holds the workpiece W. Then, the robot controller 15 identifies the workpiece W from the image P(t(i)), and calculates, as the target position Xgw, the approach point in the image P(t(i)).

For example, the robot controller 15 (the target position generation part 151) may perform the series of processings using a neural net that inputs the image P(t(i)) and outputs the approach point, or may only identify the workpiece W using such neural net.

At step S1004, the robot controller 15 (the target position generation part 151) calculates, based on the image P(t(i)), the present position, Xt(i)w, of the end effector 7 as of time t(i) in the workpiece coordinate system.

At step S1005, the robot controller 15 (the target position generation part 151) calculates a controlled variable p in a workpiece coordinate system. Specifically, the robot controller 15 obtains the controlled variable p by calculating "(target position Xgw)–(present position Xt(i)w".

At step S1006, the robot controller 15 (the target position generation part 151) determines whether the controlled variable p is smaller than a predetermined threshold (deviation). When the robot controller 15 has determined that the controlled variable p is smaller than the predetermined threshold, this method ends. When the robot controller 15 has determined that the controlled variable p is not smaller than the predetermined threshold, this method proceeds to step S1007.

At step S1007, the robot controller 15 (the target position generation part 151) converts the controlled variable p into a target position Xt(i)a of the end effector 7 in an absolute coordinate system. As used herein, the term "absolute coordinate system" refers to a coordinate system that may be fixed to any convenient place. In this embodiment, the absolute coordinate system is fixed to the ground to which the table 40 is fixed and on which the movable member 20 moves.

At step S1008, the robot controller 15 (the following delay time setting part 154) calculates the following delay time dta based on the acceleration and deceleration information of the robot 10. The following delay time dta is a period of time by which the robot 10 is delaying a response to the position command.

At step S1009, the robot controller 15 (the delay time calculation part 155) calculates the image processing time dtb based on the period of time spent in the image processing. The image processing time dtb is a period of time between the time at which the image P(t(i)) is obtained and the time at which the controlled variable p is calculated.

At step S1010, the robot controller 15 (the estimation part 152) obtains non-vision sensor information V (t(i)+dt(n)) as of time t(i)+dt(n). A non-limiting example of the non-vision sensor information is the speed or acceleration of the movable member 20. In this respect, the following relationship is satisfied: t(i)≤t(i)+dt(n)<t(i+1) (n=0, 1, 2, 3 . . . , t(0)=0).

In the above-described relationship, dt(n) denotes an acquisition interval. The acquisition interval is an interval at which the non-vision sensor information is obtained. In this embodiment, the acquisition interval of the non-vision sensor information is equal to or shorter than the image-taking interval, at which the vision sensor 3 takes an image of the workpiece W.

At step S1011, based on the non-vision sensor information V (t(i)+dt(n)) and the image P(t(i)), the robot controller 15 (the estimation part 152) estimates a time change of the relative speed V of the end effector 7 relative to the workpiece W from time t(i).

Specifically, the robot controller 15 (the estimation part 152) estimates the non-vision sensor information V (t(i)+dt(n)) and the image P(t(i)) by extrapolating the waveform of an output from a non-vision sensor, thereby estimating a time change of the relative speed V of the end effector 7 relative to the workpiece W from time t(i).

At step S1012, the robot controller 15 (the estimation part 152) integrates the time change of the relative speed V between time t(i) and time t(i)+dta+dtb, thereby calculating the offset Off (t(i)+dt(n)).

At step S1013, the robot controller 15 (the imaginary target position calculation part 153A) calculates an imaginary target position X't(i)a of the end effector 7 by adding the offset Off (t(i)+dt(n)) to the target position Xt(i)a of the end effector 7 in the absolute coordinate system.

At step S1014, the robot controller 15 (the robot control part 153B) calculates a deviation dX between the imaginary target position X't(i)a of the end effector 7 and a command position Xo (t(i)+dt(n)+ddt(m)) of the end effector 7 as of the present time. In this respect, the following relationship is satisfied: t(i)+dt(n)≤t(i)+dt(n)+ddt(m)<t(i)+dt(n+1) (in =1, 2, 3, and so forth).

In the above-described relationship, ddt(m) denotes a robot control interval. The robot control interval is an interval at which the robot 10 is controlled.

At step S1015, the robot controller 15 (the robot control part 153B) calculates the command position Xo (t(i)+dt(n)+ddt(m)) of the end effector 7 by multiplying the deviation dX by gain G.

At step S1016, the robot controller 15 (the robot control part 153B) controls the robot 10 based on the command position Xo (t(i)+dt(n)+ddt(m)) of the end effector 7.

At step S1017, the robot controller 15 determines whether the image-taking interval, at which the vision sensor 3 takes an image of the workpiece W, has come. When the robot controller 15 has determined that the image-taking interval has come, i is updated to i+1, and this method returns to step S1001. When the robot controller 15 has determined that the image-taking interval has not come, this method proceeds to step S1018.

At step S1018, the robot controller 15 determines whether the acquisition interval, at which the non-vision sensor information V (t(i)+dt(n)) is obtained, has come. When the robot controller 15 has determined that the acquisition interval has come, n is updated to n+1, and this method returns to step S1010. When the robot controller 15 has determined that the acquisition interval has not come, this method proceeds to step S1019.

At step S1019, the robot controller 15 determines whether the robot control interval, at which the robot 10 is controlled, has come. When the robot controller 15 has determined that the robot control interval has come, m is updated to m+1, and this method returns to step S1014. When the robot controller 15 has determined that the robot control interval has not come, this method returns to step S1017.

Advantageous Effects of this Embodiment

As has been described hereinbefore, the robot system 1 according to this embodiment includes the robot 10, the vision sensor 3, the target position generation part 151, the estimation part 152, and the control part 153. The robot 10 works on the workpiece W using the end effector 7. The vision sensor 3 take an image of the workpiece W. The target position generation part 151 generates, at a generation interval, a target position of the end effector 7 based on the image. The estimation part 152 estimates, at an estimation interval, a change amount of the relative position of the workpiece W relative to the end effector 7 at least based on relative position information related to the relative position. The control part 153 controls the robot 10 based on the target position and the change amount.

This ensures that even if the relative position of the workpiece W relative to the end effector 7 of the robot 10 changes during the delay time (which is the time between the time at which the image is obtained and the time at which the end effector 7 of the robot 10 reaches the target position (including time such as image processing time and control delay time)), the robot 10 is controlled based on the change amount of the relative position. This ensures that a change in the relative position is followed. This makes the end effector 7 approach the workpiece W more accurately and more rapidly.

Also in the robot system 1 according to this embodiment, the estimation part 152 estimates the change amount at the estimation interval, which is shorter than the generation interval.

This ensures that the change amount is estimated at intervals shorter than the intervals at which the target position is generated, so that the estimated change amount is reflected in the control of the robot 10. This ensures that the delay time in the generation intervals is corrected appropriately, making the end effector 7 approach the workpiece W more accurately and more rapidly.

Also in the robot system 1 according to this embodiment, the estimation part 152 estimates the change amount based on: as the relative position information, a relative speed of the end effector 7 relative to the workpiece W; and delay time that is equal to or longer than image processing time that is a period of time necessary for the target position generation part 151 to generate the target position. This ensures that a delay of time at least equivalent to the period of time necessary for the image processing is compensated for, making the end effector 7 approach the workpiece W more accurately.

The robot system 1 according to this embodiment further includes the following delay time setting part 154 and the delay time calculation part 155. The following delay time setting part 154 sets following delay time, which is the period of time by which the robot 10 is delaying a response to a position command. The delay time calculation part 155 calculates the delay time at least based on the image processing time and the following delay time. The estimation part 152 estimates the change amount based on the relative speed and the delay time calculated by the delay time calculation part 155. This ensures that not only the period of time necessary for the image processing but also the period of time by which the robot 10 is delaying a response to a position command are compensated for, making the end effector 7 approach the workpiece W more accurately.

Also in the robot system 1 according to this embodiment, the following delay time setting part 154 sets the following delay time such that the following delay time differs at least when the robot 10 is in the motion starting state and when the robot 10 is in the motion stable state. Since the following delay time set in the robot system 1 is changed based on the state in which the robot 10 is in, the end effector 7 is able to approach the workpiece W rapidly, even if the following delay time changes when the state of the robot 10 changes.

The robot system 1 according to this embodiment further includes the movable member 20 and the movable member vibration sensor 51. The movable member 20 is movable relative to the workpiece W with the robot 10 mounted on the movable member 20. The movable member vibration sensor 51 is disposed at a position on the movable member 20 further frontward than the robot 10 in its direction of progress. The movable member vibration sensor 51 detects a vibration of the movable member 20. The estimation part 152 estimates the change amount based on movable member vibration information. The movable member vibration information is related to the vibration of the movable member 20 detected by the movable member vibration sensor 51.

The robot system 1 according to this embodiment further includes the robot vibration sensor 52. The robot vibration sensor 52 is mounted on the robot 10 and detects a vibration of the robot 10. The estimation part 152 estimates the change amount based on: the movable member vibration information, which is related to the vibration detected by the movable member vibration sensor 51; and robot vibration information. The robot vibration information is related to the vibration of the robot 10 detected by the robot vibration sensor 52.

This ensures that the change amount of the relative position of the workpiece W relative to the end effector 7 is estimated based on present information and future information, making the estimated change amount highly accurate.

Also in the robot system 1 according to this embodiment, the control part 153 includes the imaginary target position calculation part 153A and the robot control part 153B. The imaginary target position calculation part 153A calculates an imaginary target position of the end effector 7 by adding the change amount estimated by the estimation part 152 at the estimation interval to the target position generated by the target position generation part 151 at the generation interval. The robot control part 153B controls the robot 10 such that the imaginary target position matches a command position of the robot 10.

This ensures that the robot 10 is controlled such that the command position matches the imaginary target position to which the change amount is added. That is, the command position follows the imaginary target position, making the actual position of the robot 10 follow the command position. This ensures that even if the change amount has discrete values, the robot 10 is able to make the end effector 7 approach the workpiece W more smoothly.

Example Hardware Configuration of Robot Controller 15

By referring to FIG. 5, an example hardware configuration of the robot controller 15 will be described.

As illustrated in FIG. 5, the robot controller 15 includes a CPU 901, a ROM 903, a RAM 905, an application specific integrated circuit 907, an input device 913, an output device 915, a recording device 917, a drive 919, a connection port 921, and a communication device 923. Examples of the application specific integrated circuit 907 include, but are not limited to, an application specific integrated circuit (ASIC) and a field-programmable gate array (FPGA). These elements are connected to each other through a bus 909 and an input-output interface 911 so that signals are transmittable to and from each other.

Programs may be recorded in the ROM 903, the RAM 905, and/or the recording device 917. The recording device 917, a non-limiting example of which is a hard disc, serves as a data storage.

Programs may also be recorded, temporarily or permanently, in: a magnetic disc such as a flexible disc; various optical discs such as a compact disc (CD), a magneto-optical (MO) disc, and a digital video disc (DVD); and a removable recording medium 925, a non-limiting example of which is a semiconductor memory. The recording medium 925 may be provided in the form of "packaged software". In this case, a program recorded in the recording medium 925 may be read by the drive 919 and recorded in the recording device 917 through devices such as the input-output interface 911 and the bus 909.

Programs may also be recorded in a download site or any other recording device such as a computer (not illustrated). In this case, the programs are transmitted to the communication device 923 through a network NW. Examples of the network NW include, but are not limited to, a local area network (LAN) and the Internet. Then, the programs received by the communication device 923 are recorded in the recording device 917 through devices such as the input-output interface 911 and the bus 909.

Programs may also be recorded in an external connection device 927, which can be any convenient connection device. In this case, the programs are transmitted through the connection port 921 and recorded in the recording device 917 through devices such as the input-output interface 911 and the bus 909.

Then, the CPU 901 performs various kinds of processings based on the programs recorded in the recording device 917, thereby implementing the processings performed by the elements of the robot controller 15, including the target position generation part 151, the estimation part 152, the control part 153 (the imaginary target position calculation part 153A and the robot control part 153B), the following delay time setting part 154, and the delay time calculation part 155. That is, the processings in the method illustrated in FIG. 4 are implemented by the CPU 901 when the CPU 901 performs various kinds of processings based on the programs recorded in the recording device 917.

In executing the programs, the CPU 901 may read the programs directly from the recording device 917 or may temporarily load the programs in the RAM 905. When the CPU 901 receives the programs through devices such as the communication device 923, the drive 919, and the connection port 921, the CPU 901 may execute the programs without storing the programs in the recording device 917.

As necessary, the CPU 901 may perform the various kinds of processings based on signals or information input through the input device 913, such as a mouse, a keyboard, and a microphone (not illustrated).

Then, the CPU 901 may output results of the processings from the output device 915, such as a display device and a sound output device. As necessary, the CPU 901 may send results of the processings through the communication device 923 and the connection port 921 and store the results of the processings in the recording device 917 and/or the recording medium 925.

As used herein, the term "perpendicular" means substantially or approximately perpendicular within some design tolerance or manufacturing tolerance, as well as precisely perpendicular. As used herein, the term "parallel" means substantially or approximately parallel within some design tolerance or manufacturing tolerance, as well as precisely parallel. As used herein, the term "planar" means substantially or approximately planar within some design tolerance or manufacturing tolerance, as well as precisely planar.

Also, when the terms "identical", "same", "equivalent", and "different" are used in the context of dimensions, magnitudes, sizes, or positions, these terms may not necessarily mean "identical", "same", "equivalent", and "different", respectively, in a strict sense. Specifically, the terms "identical", "same", "equivalent", and "different" are intended to mean "substantially or approximately identical", "substantially or approximately same", "substantially or approximately equivalent", and "substantially or approximately different", respectively, within some design tolerance or manufacturing tolerance.

Otherwise, the above-described embodiment and modification may be combined in any manner deemed suitable.

Obviously, numerous modifications and variations of the present disclosure are possible in light of the above teachings. It is therefore to be understood that within the scope of the claims, the present disclosure may be practiced otherwise than as specifically described herein.

What is claimed as new and desired to be secured by Letters Patent of the United States is:

1. A method for controlling a robot with an end effector, the method comprising:
    taking an image of a workpiece on which the robot is configured to work via the end effector, which is disposed at a relative position, and which is relatively movable with respect to the end effector;
    generating, based on the image, a target position of the end effector at every generation interval;
    estimating a change amount in the relative position at every estimation interval, at least based on relative position information related to the relative position and based on delay time that is equal to or longer than image processing time that is a period of time necessary to generate the target position, such that the estimation interval is shorter than the generation interval, wherein the relative position information includes a relative speed of the end effector relative to the workpiece; and
    controlling the robot to move the end effector based on the target position and the change amount.

2. A non-transitory computer-readable storage medium storing a program for causing a computer to perform, in a robot controller:
    taking an image of a workpiece on which the robot is configured to work via the end effector, which is disposed at a relative position, and which is relatively movable with respect to the end effector;
    generating, based on the image, a target position of the end effector at every generation interval;
    estimating a change amount in the relative position at every estimation interval, at least based on relative position information related to the relative position and based on delay time that is equal to or longer than image processing time that is a period of time necessary to generate the target position, such that the estimation interval is shorter than the generation interval, wherein the relative position information includes a relative speed of the end effector relative to the workpiece; and
    controlling the robot to move the end effector based on the target position and the change amount.

3. A robot controller to control a robot, the robot controller comprising:
- a target position generation circuit configured to generate a target position of an end effector of the robot at every generation interval based on an image of a workpiece on which the robot is configured to work via the end effector, which is disposed at a relative position, and which is relatively movable with respect to the end effector;
- an estimation circuit configured to, at least based on relative position information related to the relative position, estimate a change amount in the relative position at every estimation interval; and
- a control circuit configured to control the robot to move the end effector based on the target position and the change amount,
- wherein the estimation circuit is configured to estimate the change amount such that the estimation interval is shorter than the generation interval,
- wherein the relative position information comprises a relative speed of the end effector relative to the workpiece, and
- wherein the estimation circuit is configured to estimate the change amount based on the relative position information and delay time that is equal to or longer than image processing time that is a period of time necessary for the target position generation circuit to generate the target position.

4. A robot system comprising:
- a robot including an end effector and configured to work via the end effector on a workpiece which is disposed at a relative position and which is relatively movable with respect to the end effector;
- a vision sensor configured to take an image of the workpiece;
- a target position generation circuit configured to, based on the image, generate a target position of the end effector at every generation interval;
- an estimation circuit configured to, at least based on relative position information related to the relative position, estimate a change amount in the relative position at every estimation interval; and
- a control circuit configured to control the robot to move the end effector based on the target position and the change amount,
- wherein the estimation circuit is configured to estimate the change amount such that the estimation interval is shorter than the generation interval,
- wherein the relative position information comprises a relative speed of the end effector relative to the workpiece, and
- wherein the estimation circuit is configured to estimate the change amount based on the relative position information and delay time that is equal to or longer than image processing time that is a period of time necessary for the target position generation circuit to generate the target position.

5. The robot system according to claim 4, further comprising:
- a following delay time setting circuit configured to set following delay time that is a period of time by which the robot is delaying a response to a position command; and
- a delay time calculation circuit configured to calculate the delay time at least based on the image processing time and the following delay time,
- wherein the estimation circuit is configured to estimate the change amount based on the relative speed and the delay time.

6. The robot system according to claim 5, wherein the following delay time setting circuit is configured to set the following delay time such that the following delay time differs at least when the robot is in a motion starting state and when the robot is in a motion stable state.

7. The robot system according to claim 6, further comprising:
- a carrier which is movable relative to the workpiece and on which the robot is disposed at a first position; and
- a movable member vibration sensor disposed at a second position on the carrier, the second position being further frontward than the first position in a direction of progress of the robot, the movable member vibration sensor being configured to detect a movable member vibration of the carrier.

8. The robot system according to claim 7, further comprising:
- a robot vibration sensor disposed on the robot and configured to detect a robot vibration of the robot.

9. The robot system according to claim 5, further comprising:
- a carrier which is movable relative to the workpiece and on which the robot is disposed at a first position; and
- a movable member vibration sensor disposed at a second position on the carrier, the second position being further frontward than the first position in a direction of progress of the robot, the movable member vibration sensor being configured to detect a movable member vibration of the carrier.

10. The robot system according to claim 9, further comprising:
- a robot vibration sensor disposed on the robot and configured to detect a robot vibration of the robot.

11. The robot system according to claim 4, further comprising:
- a carrier which is movable relative to the workpiece and on which the robot is disposed at a first position; and
- a movable member vibration sensor disposed at a second position on the carrier, the second position being further frontward than the first position in a direction of progress of the robot, the movable member vibration sensor being configured to detect a movable member vibration of the carrier.

12. The robot system according to claim 11, further comprising:
- a robot vibration sensor disposed on the robot and configured to detect a robot vibration of the robot.

13. The robot system according to claim 4, wherein the control circuit comprises
- an imaginary target position calculation circuit configured to calculate an imaginary target position of the end effector by adding the change amount estimated at the estimation interval to the target position generated at the generation interval, and
- a robot control circuit configured to control the robot such that the imaginary target position matches a command position of the end effector.

* * * * *